United States Patent
Lee et al.

(10) Patent No.: US 9,613,456 B2
(45) Date of Patent: Apr. 4, 2017

(54) ENHANCED DUAL QUATERNION SKINNING WITH SCALE NON-COMPENSATING JOINTS AND SUPPORT JOINTS

(71) Applicant: Disney Enterprises, Inc., Burbank, CA (US)

(72) Inventors: Gene Lee, Burbank, CA (US); Chung-An Lin, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 246 days.

(21) Appl. No.: 14/269,401

(22) Filed: May 5, 2014

(65) Prior Publication Data

US 2015/0002517 A1  Jan. 1, 2015

Related U.S. Application Data

(60) Provisional application No. 61/841,041, filed on Jun. 28, 2013.

(51) Int. Cl.
  *G06T 17/10* (2006.01)
  *G06T 13/40* (2011.01)

(52) U.S. Cl.
  CPC .............. *G06T 17/10* (2013.01); *G06T 13/40* (2013.01)

(58) Field of Classification Search
  None
  See application file for complete search history.

(56) References Cited

U.S. PATENT DOCUMENTS

2011/0304622 A1* 12/2011 Rogers .................... G06T 13/40
                                                345/420
2015/0187134 A1* 7/2015 Baecher ................. G06T 17/10
                                                345/420

OTHER PUBLICATIONS

Maraffi; MEL Scripting a Character Rig in Maya; New Riders, p. 27, Nov. 2008.*
Autodesk; Maya FBX Plug-In What's New—Known Limitations for this Version; https://web.archive.org/web/20100130111227/http://download.autodesk.com/us/fbx/FBX_Maya_online/files/WS73099cc142f487553d114b751181c40f14b1283.htm; captured by the Internet Archive on Jan. 30, 2010.*
Derakhshani; Introducing Maya 2009; Autodesk Maya Press; 2009.*
Lee, Gene S. et al., Enhanced Dual Quaternion Skinning for Production Use, Talk submitted to 2013 Siggraph, Jul. 21, 2013, p. 1, Burbank, CA, USA.

(Continued)

*Primary Examiner* — James A Thompson
(74) *Attorney, Agent, or Firm* — Sheppard, Mullin, Richter & Hampton LLP

(57) ABSTRACT

Methods and systems for two-phase skinning of an object undergoing rigid and non-rigid transformations are disclosed. One method of skinning the object may include separating the object's joint transformations into rigid and non-rigid parts by determining if a joint is scale compensating or scale non-compensating, applying non-rigid joint transformations to the mesh, and applying rigid joint transformations to the mesh. Separation of the object's joint transformations into rigid and non-rigid parts may include determining a bind pose based on an initial configuration of the object's joints and determining an intermediate pose based on the configuration of the object's joints after non-rigid joint transformations are applied to the joints.

16 Claims, 9 Drawing Sheets
(7 of 9 Drawing Sheet(s) Filed in Color)

(56) References Cited

OTHER PUBLICATIONS

Kavan, Ladislav et al., Geometric Skinning with Approximate Dual Quaternion Blending, ACM, New York, vol. 27, 105, 2008.
Lee, Gene S. et al., Enhanced Dual Quaternion Skinning for Production Use, Presentation 2013 Siggraph, Jul. 21, 2013, pp. 1-35, Burbank, CA, USA.

* cited by examiner

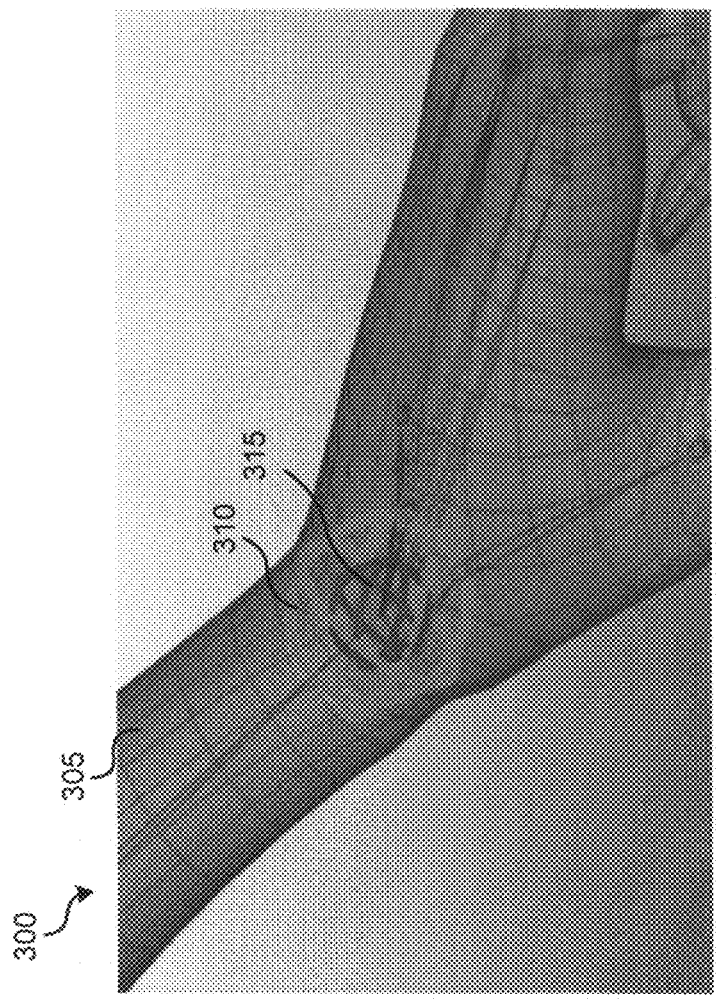

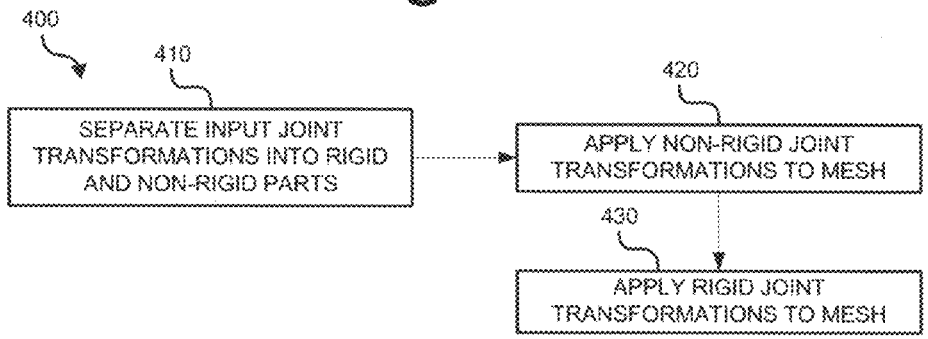
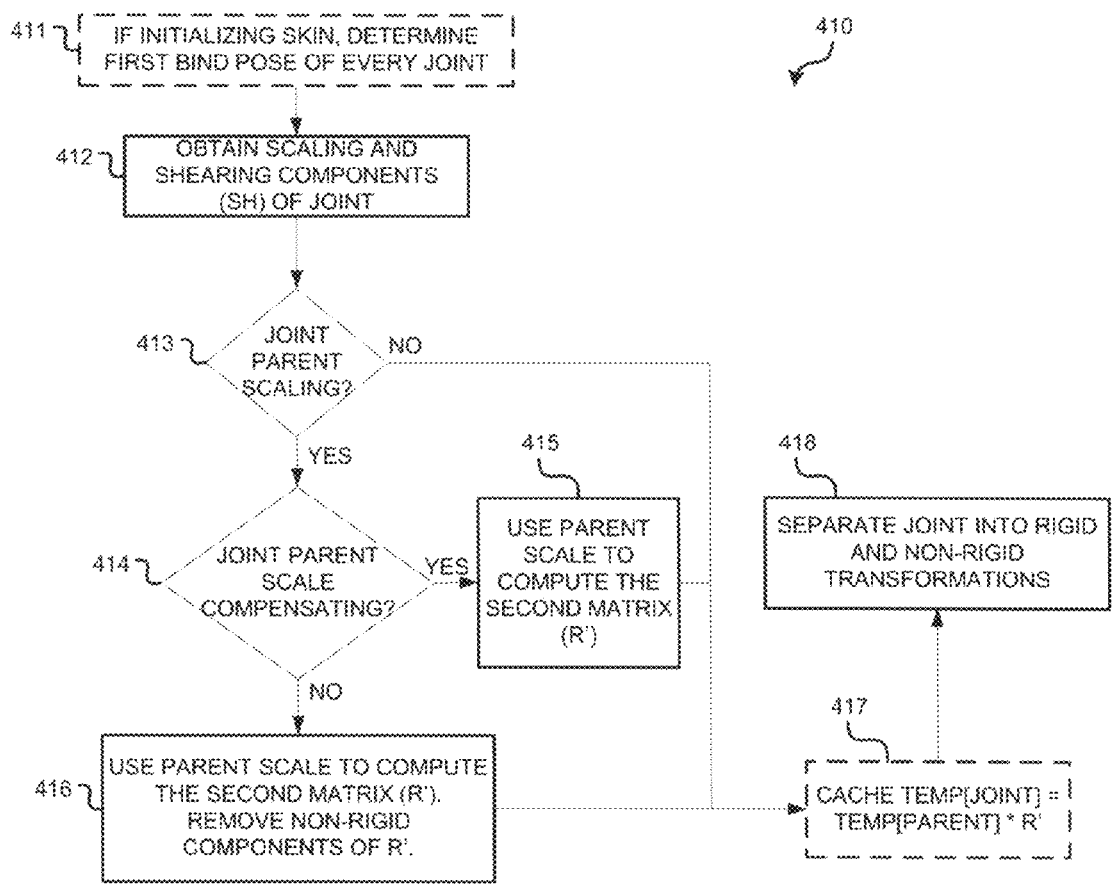

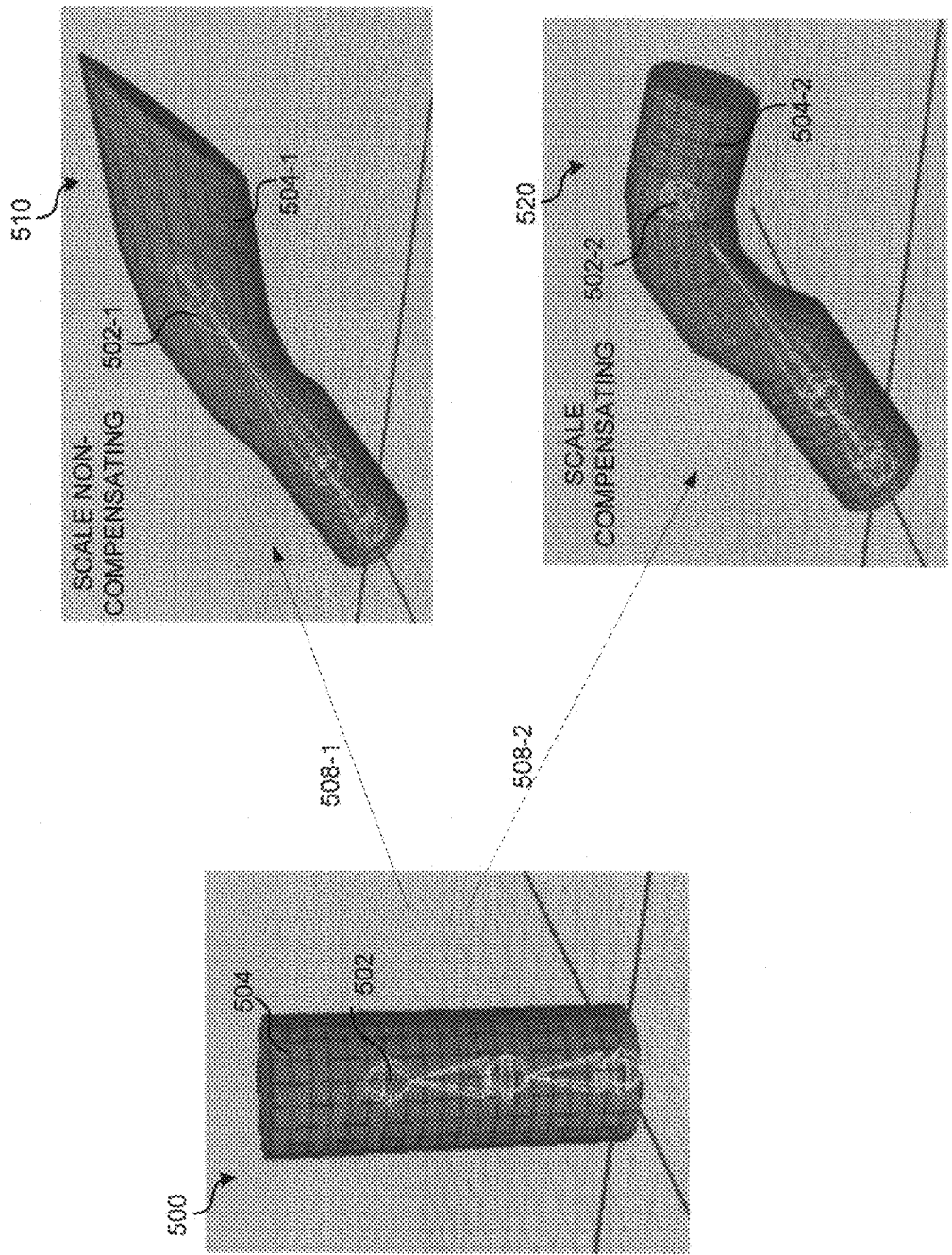

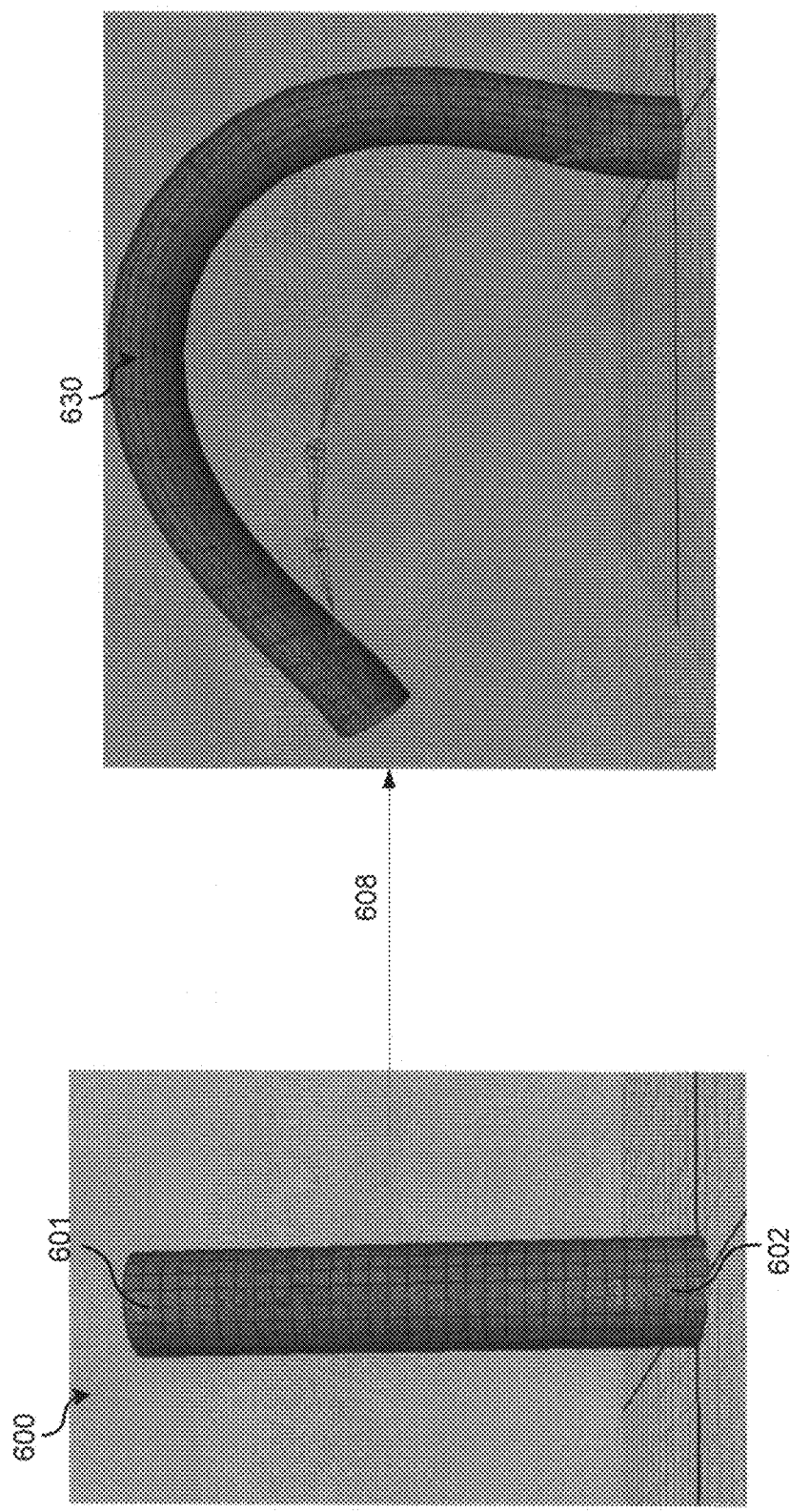

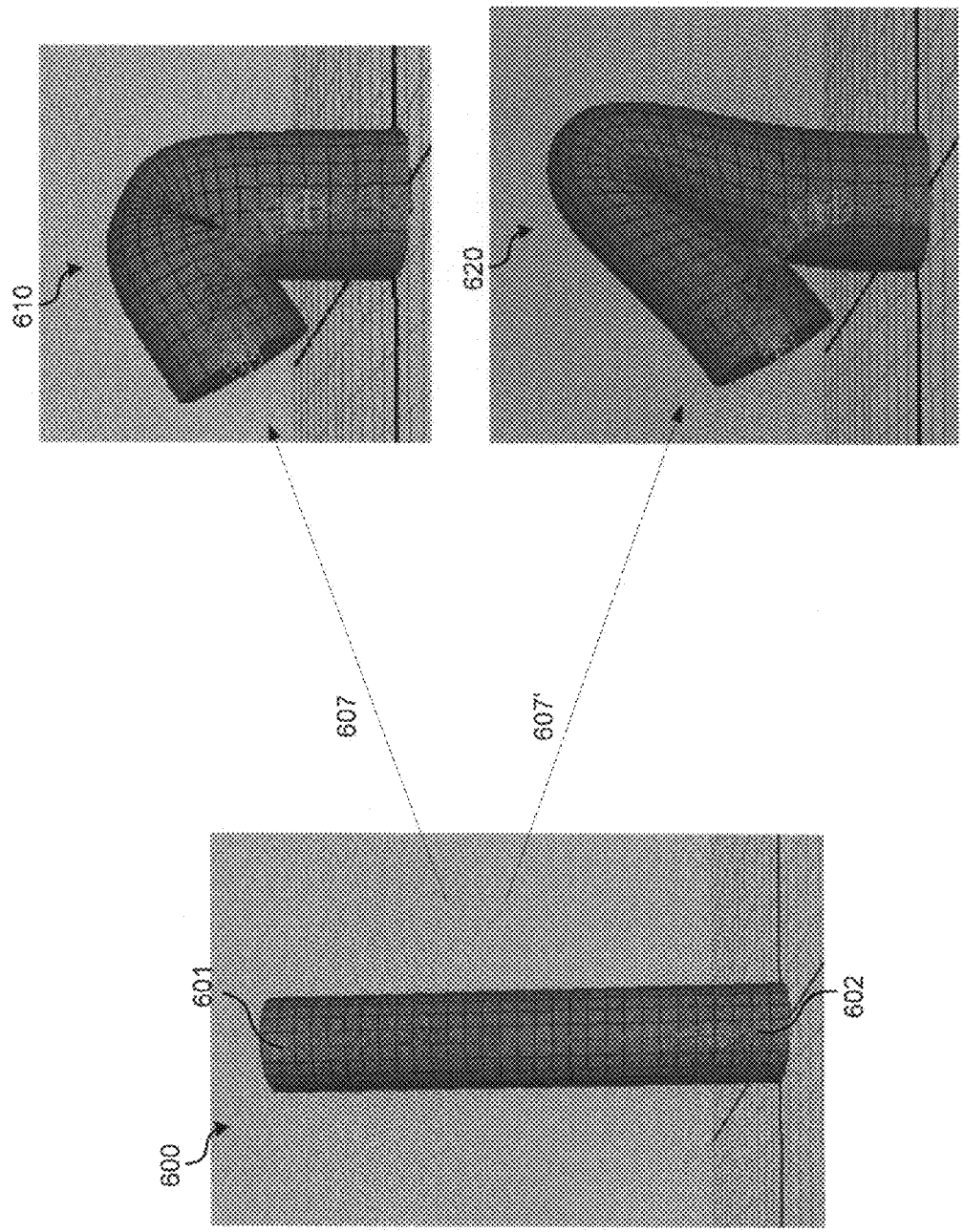

ENHANCED DUAL QUATERNION SKINNING WITH SCALE NON-COMPENSATING JOINTS AND SUPPORT JOINTS

CROSS-REFERENCE TO RELATED APPLICATIONS

This application claims the benefit of U.S. Provisional Application No. 61/841,041 filed on Jun. 28, 2013, which is incorporated herein by reference in its entirety.

TECHNICAL FIELD

The present disclosure relates generally to computer animation skinning techniques, and more particularly, some embodiments relate to computer-implemented systems and methods for skinning objects.

DESCRIPTION OF THE RELATED ART

Animating dynamic objects such as characters (e.g., people or creatures) is a demanding area of animation that requires the animated object to move and deform in a visually plausible manner. Skinning of a skeleton-driven model is a technique used for animation of such objects. Such techniques generally define the skin's movement as a function of an underlying skeleton. Linear skinning techniques, where skinning transformations are represented as matrices and blended linearly, are a popular standalone animation technique because of their computational efficiency and ease of implementation. Such techniques, however, are prone to artifacts such as skin-collapsing defects (i.e., "candy-wrapper" effect) when attempting to model rigid transformations involving rotations. More recently, dual quaternion skinning (DQS) techniques have been introduced to avoid the artifacts inherent in linear skinning.

BRIEF SUMMARY OF THE DISCLOSURE

According to various embodiments of the disclosed methods and systems, a two-stage approach for skinning an object undergoing rigid and non-rigid transformations is illustrated. The object includes a mesh and a plurality of joints. The two-stage approach may be applied to objects comprising all scale compensating joints, all scale non-compensating joints, or a mixture of the two types of joints. The two-stage approach may also be applied to objects comprising support joints.

In one embodiment, skinning the object comprises separating joint transformations into rigid and non-rigid parts by determining whether the joint is scale compensating or scale non-compensating, applying non-rigid joint transformations to the object's mesh, and applying rigid joint transformations to the object's mesh. In one embodiment, the non-rigid joint transformations are applied using linear skinning, and the rigid joint transformations are applied used Dual Quaternion Skinning (DQS). In one particular embodiment, non-rigid joint transformations are applied using Linear Blend Skinning.

In one embodiment, the object comprises a support joint. In implementations of this embodiment, the support joint may be associated with the mesh when non-rigid joint transformations are applied to the mesh, when rigid joint transformations are applied to the mesh or when both rigid and non-rigid joint transformations are applied to the mesh.

Other features and aspects of the disclosed method and system will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The figures are provided for purposes of illustration only and merely depict typical or example embodiments. They do not limit the breadth, scope, or applicability of the invention.

FIG. 3A illustrates a support joint.

FIGS. 4A-4B are operational flow diagrams illustrating an example two-stage process of skinning an object undergoing rigid and non-rigid transformations.

FIG. 5 illustrates the transformation of an object in the two cases where a joint is scale compensating and is scale non-compensating.

FIGS. 6A-6B illustrate the transformation of an object when support joints are associated with the mesh and when support joints are not associated with the mesh.

DETAILED DESCRIPTION

The present disclosure is directed toward methods for skinning an object undergoing rigid and non-rigid transformations. Before describing the disclosure in detail, it is useful to describe the principal features of an object undergoing skeletal animation. Moreover, it is useful to describe the shortcomings of present skeletal animation techniques.

Skeletal animation is a computer animation technique that represents an object in two primary parts: 1) a skin or mesh that is a surface representation of the object, and 2) a set of interconnected joints (a skeleton or rig) used to animate the mesh. In one embodiment, a joint or node may refer to a bone and the pivot about which it rotates, or a joint may just refer to a pivot. In another embodiment, the joints of the skeleton may be referred to as bones. Joints may be related in a hierarchy by joint transformations. Moreover, an object may include vertex weights that describe the amount of influence of individual joints on each vertex of the mesh.

Skeletal animation may be applied to transform any object that implements the mesh and rig structure. For example, it may be applied to a whole or a part (e.g., arm, leg, hand, foot, torso) of an animated character, creature, or similar object. Alternatively, it may be applied to animations of other objects, such as clothing, a door, a fork, a building, a computer, or a galaxy.

Figure 1A:
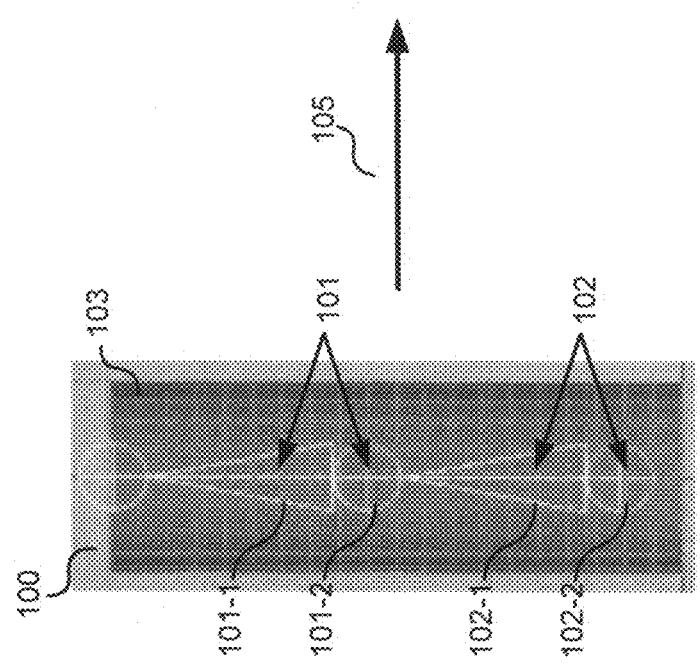
FIG. 1A illustrates an example object that may be used in implementations of the present disclosure.
Figure 1B:
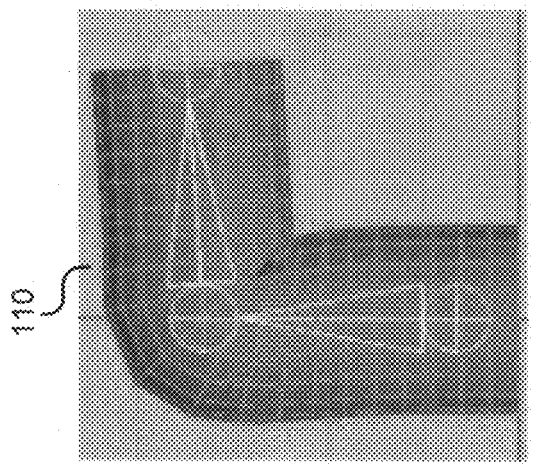
FIG. 1B illustrates an example joint transformation of the object of FIG. 1A.

FIG. 1A illustrates an example object with shape 100 that may be used in embodiments of the present disclosure. Object 100 comprises a mesh 103, joint 101 with bone 101-1 and pivot 101-2, and joint 102 with bone 102-1 and pivot 102-2. As illustrated in FIG. 1B, applying an example joint transformation 105 to joint 101 deforms the object into a new shape 110. Transformation 105 in this example rotates joint 101 to a new position, which in turn deforms the overlying mesh as the object bends into a new shape.

A joint transformation for animating an object may be rigid or non-rigid. Rigid transformations preserve the shape of the transformed joint. A rigid transformation may comprise a rotation, translation, or reflection of the joint. Transformation 105, for example, illustrates a rotation of joint 101. By contrast, non-rigid transformations change the shape of the transformed joint. A non-rigid transformation may comprise a shear or scaling of the joint. A squash or stretch of an object, for example, is a non-rigid transformation.

Skinning techniques are used to bind a mesh to skeletal joints and correspondingly animate the mesh deformation of an object based on the movement or transformation of underlying joints. Linear skinning, for example, is a low-computational cost skinning approach where a mesh follows an object's joints during transformations. Linear skinning techniques may include linear blend skinning (LBS), animation space, and multi-weight enveloping. LBS is particularly computationally efficient and easy to implement. However, the meshes of objects undergoing LBS may exhibit volume loss and the "candy-wrapper" effect during rigid transformations with a rotational component. This is because the transformation matrices of influencing joints are interpolated in a linear manner when finding the position of a vertex in a new pose. Because the linear interpolation of these matrices is not the linear interpolation of their rotations, the mesh volume loss increases as the rotation angle increases. Although animation space and multi-weight enveloping alleviate some of the issues associated with LBS rigid transformations, they have higher computational costs and still exhibit some skin collapsing defects and/or artifacts during rigid transformations. Other non-linear blending techniques such as direct quaternion blending, log-matrix blending, and spherical blending have also been implemented to alleviate the issues associated with LBS rigid transformations. These methods too, however, exhibit some artifacts and fall short of delivering a natural mesh deformation in all rigid transformations.

Dual Quaternion Skinning (DQS) avoids the skin collapsing defects and artifacts exhibited by other techniques during rigid transformations comprising rotational and translational parts. Moreover, DQS exhibits computational complexity nearly on par with LBS. Accordingly, DQS may be effectively used to skin objects during rigid transformations. However, direct DQS support for non-rigid transformations may require the use of computationally costly high-dimensional algebra. A two-stage skinning technique that separates joint transformations into rigid and non-rigid components may be used to address the above problems. Under this approach, linear skinning, for example, may be applied for non-rigid transformations and DQS may be applied for rigid transformations. Such a technique is computationally efficient and generates high quality skinning.

Although a two-phase skinning approach has been suggested, current implementations of two-phase skinning are deficient and not ready for the production environment. In particular, current two-phase methods of skinning an object fail to provide a generalized approach for skinning objects comprising a mixture of compensating and non-compensating joints. Moreover, current two-phase methods of skinning fail to provide an approach for considering support joints during skinning. Embodiments of the current disclosure address these deficiencies.

Figure 2A:
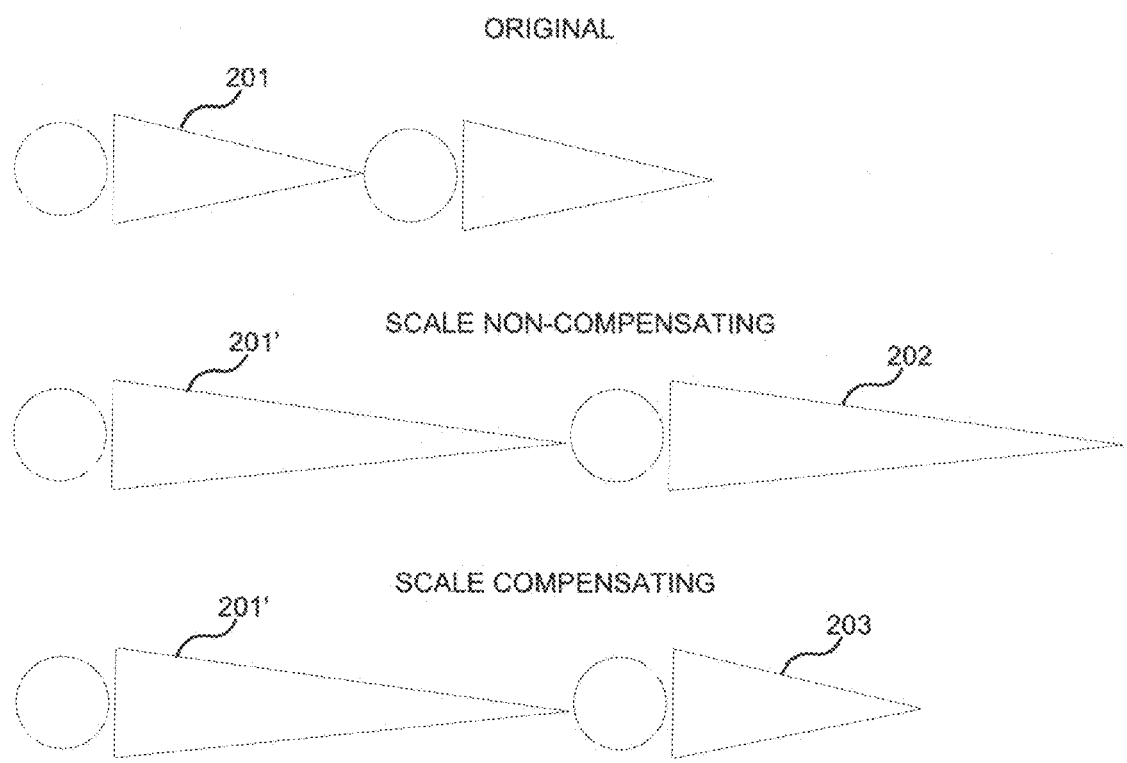
FIGS. 2A-2B illustrate scale compensating and scale non-compensating joints.

First, embodiments of the current disclosure provide a generalized approach for skinning objects comprising all scale compensating joints, all scale non-compensating joints, or a mixture of the two types of joints. FIG. 2A illustrates the differences between scale compensating and scale non-compensating joints. A scale non-compensating joint 202 is influenced by the scale and shear coming from its parent 201'. For example, if joint 201 is elongated during a non-rigid transformation into joint 201', then non-compensating joint 202 is also elongated during a non-rigid transformation. By contrast, a scale compensating joint 203 inhibits the scale and shear coming from its parent 201'. For example, if joint 201 is elongated during a non-rigid transformation into joint 201', joint 203 is not elongated.

Figure 2B:
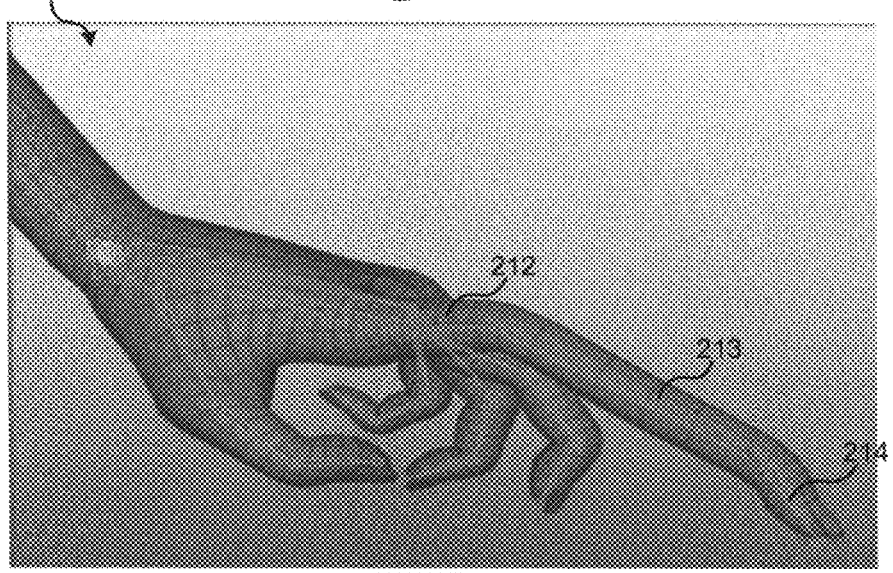

FIG. 2B illustrates an example object 210 (character hand) that may be animated using embodiments of the present disclosure. Object 210 includes a mixture of scale compensating and scale non-compensating joints. Particularly, object 210 comprises scale non-compensating joint 213, and scale compensating joints 212 and 214. While joint 214 does not accept the scale of its parent joint 213, joint 213 does accept the scale of its parent joint 212. As illustrated in this example embodiment, the presence of scale compensating and scale non-compensating joints allows joint transformations to apply scale to all descendants, some descendants, or to a single joint.

Second, embodiments of the present disclosure consider the support joints used in production environments. Conventional skinning approaches bind joints directly to a mesh during skinning using weighting values as described in Kavan, L., Collins, S., Zara, J., and O'Sullivan, C. 2008. *Geometric skinning with approximate dual quaternion blending.* ACM, New York, vol. 27, 105. However, in production environments, there may be support joints. Support joints support the architecture of the object's rig. Conventional skinning approaches neither bind nor associate these support joints with the mesh during skinning processes.

FIG. 3A illustrates an example object 300 with mesh 305, conventional joint 310 (red), and support joint 315 (blue). Support joint 315 links the end of the arm to the wrist via a constraint (e.g. position or orientation) and is part of the rig hierarchy, but is not bound to the mesh. Conventional joint 310 is the wrist joint bound to the mesh and constrained to the position of support joint 315. In some embodiments, a position constraint may be used to adjust the way a user selects joints in a rig. In some graphics applications, for example, this may be used to prevent the selection of all descendants of a joint when the joint is selected. In object 300, for example, constraining conventional joint 310 to the position of support joint 315 prevents selection of the entire hand when the wrist (support joint 315) is selected.

A support joint may create constraints between different joints, push scale information to other joints, or otherwise functionally enhance a rig. In a production environment having an object with a joint chain comprising three or more joints, for example, the animation production operators may bind the first and last joint to the object's mesh and skip ones in between. In this example embodiment, the support joints that are not bound to the mesh support the architecture of the rig. As will be further described in embodiments below, support joints may be considered in two-phase skinning by associating them with the mesh and using them to pass scale information to descendant joints. In these embodiments, the support joints are associated with, but not bound with, the mesh. The associated support joints influence the positioning and orientation of the bound joints. The support joints are not used to compute mesh positions. Unlike a conventional joint, which is bound to a mesh, a support joint is not associated with skin weight values. In this manner, support joints may be considered in the determination of the non-rigid and rigid parts of a transformation and the skinning of the object.

Figure 3B:
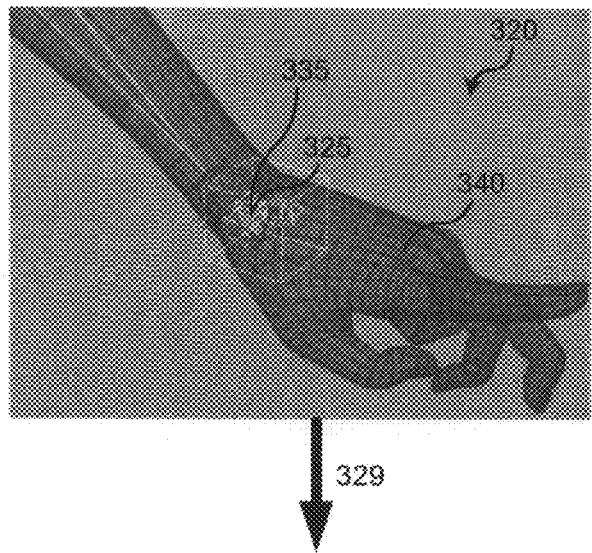
FIGS. 3B-3D illustrate an object that undergoes scaling transformation of a conventional joint and scaling transformation of a support joint.
Figure 3C:
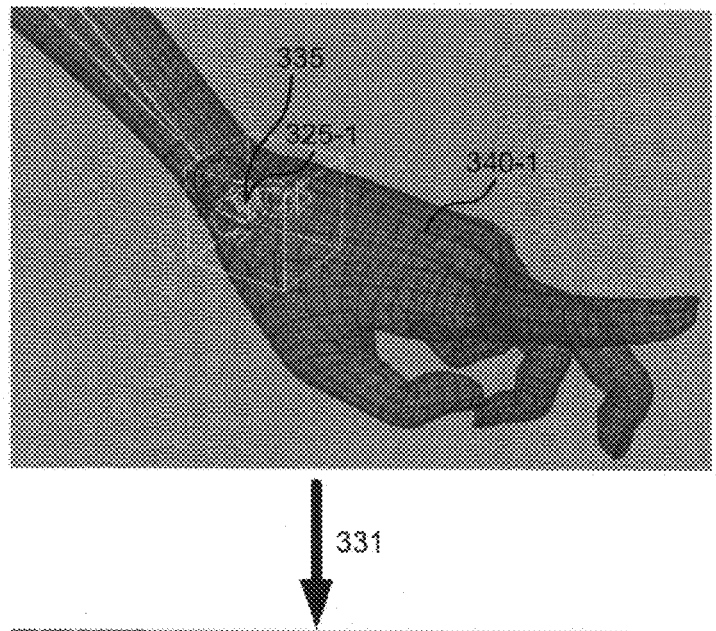
Figure 3D:
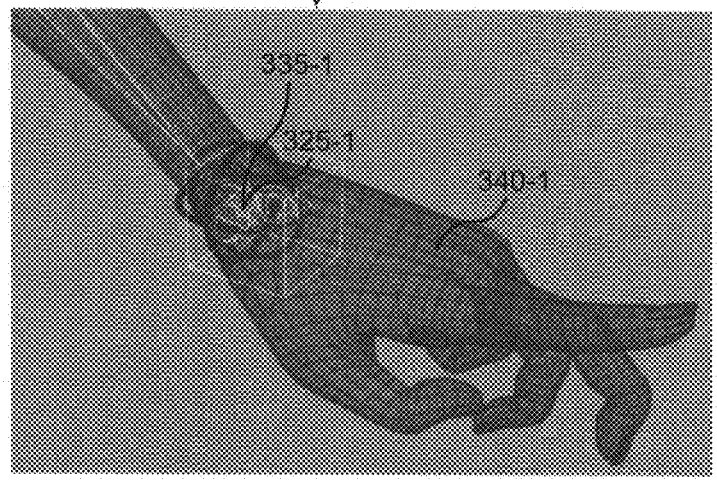

FIGS. 3B through 3D illustrate an object 320 that undergoes scaling transformation 329 of a conventional joint and scaling transformation 331 of a support joint. FIG. 3B is the original object 320. Original object 320 comprises a conventional wrist joint 325 (yellow), support joint 335, and hand 340. Conventional wrist joint 325 is bound to the mesh. Support joint 335 is associated with the mesh. All joints of hand 340 are descendants of wrist joint 325. FIG. 3C illustrates object 320 after it undergoes scaling transformation 329. Scaling transformation 329 scales conventional wrist joint 325 (yellow), thereby creating scaled wrist joint 325-1 (yellow). The scaling of wrist joint 325-1 causes original hand 340 to scale to scaled hand 340-1. Subsequently, scaling transformation 331 is applied. FIG. 3D illustrates object 320 after undergoing scaling transformation 331. Scaling transformation 331 scales support joint 335, thereby creating scaled support joint 335-1 (blue). The hand does not scale further when support joint 335 scales.

FIGS. 4A-4B are operational flow diagrams illustrating an example two-stage process 400 of skinning an object undergoing rigid and non-rigid transformations. In this exemplary process, the skinned object comprises a mesh and an underlying rig or skeleton comprising one or more joints. Prior to beginning process 400, the rig of the object may have been manually rigged by a user, automatically rigged by a computing device, or some combination thereof. The object may comprise all scale compensating joints, all scale non-compensating joints or some combination thereof. Moreover, in this exemplary process, the object may comprise one or more support joints. Process 400 may be used to skin any object undergoing a combination of rigid and non-rigid transformations. For example, the object may comprise a character flexing an arm (e.g., muscle bulge is simulated as non-rigid transformation, arm movement is simulated as rigid transformation), a character pointing a finger that elongates, an evolving creature that scales, clothing that expands/shrinks and wrinkles, etc.

In exemplary process 400, a bind pose determines how the joints are bound to the mesh during a non-rigid joint transformation (operation 420), and an intermediary pose determines how the joints are bound to the mesh during a rigid joint transformation (operation 430). The bind pose or rest pose is the pose that the object mesh is in when the joints are bounded to the mesh (i.e. the skin is initialized). For example, if the object is a character, the rest pose may be the character with arms stretched out in the "T" position or the character with arms stretched out at 45-degree angles from its body. Whereas the bind pose is defined only during this initialization of the skin, the intermediary pose is recomputed each time the joints are updated. In one embodiment, the intermediary pose is dynamically re-computed during animation runtime.

For example, when a joint is scaled (non-rigid transformation), it compares its current scale with the bind pose scale. The difference in scale is then applied during the scaling transformation. The joint may subsequently be rotated (rigid transformation). During this rigid transformation, the joint compares its current rotation with the intermediary pose rotation. The difference in rotation is then applied during the rotation transformation. For a particular pose, each joint has an associated matrix (R) that defines the position, orientation and scale of a joint relative to its parent. In another embodiment, the matrix for a particular joint may be defined relative to world space. The bind pose or intermediary pose is defined by all the matrices of the joints.

At operation 410, input joint transformations are separated into rigid and non-rigid parts in preparation for deforming the object in two phases. The input joint transformations may have been manually specified by a user, automatically specified by a computing device, or some combination thereof. FIG. 4B illustrates an example process 410 that may be implemented to separate the joint transformations for one joint into rigid and non-rigid parts.

At operation 411, during initialization of the skin, the bind pose of every joint is determined. Each joint has an associated first matrix R that defines its position, orientation and scale of a joint relative to its parent, i.e. in the bind pose. If the skin has already been initialized, operation 411 is skipped. Subsequent, operations 412 to 417 determine the intermediary pose for each joint.

At operation 412, the scaling and shearing components (SH) of the joint matrix are obtained. These components may be considered during a subsequent operation for determining the final non-rigid transformation matrix for the joint.

A second matrix R' is then computed for the joint according to the scaling and shearing components of its parent (if the joint has no parent, R'=R). At decision 413, it is determined if the joint's parent is scaling. If the joint being considered is the root joint of the joint hierarchy, the root's parent is the world. If the joint's parent is scaling, operation 414 determines if the joint's parent is scale compensating or scale non-compensating. If the joint's parent is scale compensating, at operation 415 the parent's scale is used to compute a second matrix R' for the joint. In one embodiment of operation 415, R' is computed for the joint by scaling the translational part (but not the rotational part) of the joint's first matrix R by the scale and shear (non-rigid transformation) of its parent. If the joint's parent is scale non-compensating, at operation 416 the parent's scale is used to compute a second matrix R' for the joint. After R' is computed, non-rigid components (scaling and shearing components) of R' are removed. In one embodiment of operation 416, the second matrix R' is computed for the joint by scaling all (rotational and translational part) of the joint's matrix R by the scale and shear of its parent and subsequently removing non-rigid components of R'.

An optional caching operation 417 may be performed subsequent to operations 415 or 416 (or subsequent to operation 413 if the joint's parent is not scaling). Caching operation 417 caches a temporary matrix that may be defined by Equation (1):

$$\text{TEMP[JOINT]} = \text{TEMP[PARENT]} * R' \text{ IF parent not root node}$$

$$\text{TEMP[JOINT]} = R \text{ IF parent is root node} \qquad (1)$$

Where TEMP[JOINT] is a temporary matrix for the joint, TEMP[PARENT] is a temporary matrix for the joint's parent, and R' is the computed second matrix for the joint. Caching operation 417 provides the benefit of avoiding repetitive calculations (i.e. re-computing TEMP for the parent) during subsequent iterations of process 410 for other joints. In embodiments where caching operation 417 is implemented, joints are processed downstream (apply process 410 for each joint) from the highest part of the joint chain that is involved in joint transformations to the lowest part of the joint chain involved in joint transformations.

Caching operation provides the benefit of reducing the number of operations since downstream processing is only needed starting from joints that change value. For example, consider a joint chain A->B->C->D->E, where only joints C, D, and E are transformed. The first joint that changes value (C) computes its R' matrix using the cached value of its parent (B). This computation updates the TEMP value of C, which is subsequently used by the next joint (D) in the chain to compute its R' matrix. Similarly, joint E uses the updated TEMP value of D to compute its R' matrix. In some embodiments, caching operation 417 may be performed for joints that do not change values. In an alternative embodiment, a caching operation is not performed and every joint is processed starting from the root joint.

At operation 418, the joint is separated into two transformations: one rigid and the other non-rigid. In an exemplary mathematical implementation that includes caching operation 417, the non-rigid (NT[JOINT]) and rigid (RT[JOINT]) transformation matrices for the joint may be defined by Equations (2) and (3):

$$NT[JOINT]=TEMP[JOINT] \times S \times A^{-1}[JOINT] \text{ if JOINT has scale/shear}$$

$$TEMP[JOINT] \times A^{-1}[JOINT] \text{ if JOINT does not scale/shear} \qquad (2)$$

$$RT[JOINT]=J_0 \times TEMP^{-1}[JOINT] \qquad (3)$$

Where TEMP[JOINT] is as defined in Equation (1). A is the absolute joint matrix of a joint that is created by assembling and multiplying the computed matrices R from the joint to the root joint. $A^{-1}$[JOINT] is the inverse absolute matrix of the joint. S is a simple transformation without rotation or translation that has the scaling/shearing values of the original joint. $J_0$ is the original joint without any scaling or shearing components, i.e. it retains the same rotation & translation values as the original joint.

In some embodiments, 410 is iteratively repeated only for a set of joints in the object's rig (e.g. joints undergoing transformations). In other embodiments, process 410 is iteratively repeated for all joints in the object's rig.

In one embodiment, the object may include one or more support joints. In this embodiment, a support joint may push scale information from parent joints in the hierarchy and support functional constraints. In exemplary process 410, the support joint is considered for separating input joint transformations into rigid and non-rigid parts. In an alternative embodiment, the support joint may not be considered.

At operation 420, the non-rigid joint transformations are applied to the mesh to form a modified mesh. In one embodiment, application of a non-rigid transformation comprises applying the non-rigid transformation matrix for a joint. In another embodiment, the transformation may comprise applying non-rigid transformation matrices for a respective plurality of non-rigidly transformed joints. In one embodiment, operation 420 is performed using Linear Blend Skinning (LBS). In another embodiment, other linear skinning techniques such as animation space and multi-weight enveloping may be used to apply the non-rigid joint transformations to the mesh. In yet other embodiments, other non-linear skinning methods may be used.

In one embodiment, the object includes a support joint that is associated with the mesh when performing operation 420. The support joint may be associated with the other joints or separately. In another embodiment, a support joint is associated with the mesh only if it is determined that the support joint influences the non-rigid transformation of the mesh. Selection of a support joint may be automatic (computer implemented), manual (by a user), or some combination thereof.

At operation 430, the rigid joint transformations are applied to the modified mesh that results from operation 420. In one embodiment, application of a rigid transformation comprises taking the rigid transformation matrix for a joint. In another embodiment, the transformation may comprise applying rigid transformation matrices for a respective plurality of rigidly transformed joints. In the illustrated embodiment, operation 430 may be performed by DQS. In other embodiments, another skinning method or some combination of DQS and another skinning method may be used to perform the operation.

In one embodiment, the object includes a support joint that is associated with the mesh when performing operation 430. In this embodiment, information corresponding to the associated support joint may be saved on a list that comprises information of the other joints bounded to the mesh. Alternatively, support joint information may be saved in a separate list. The list may be stored on any computer usable storage medium. In another embodiment, a support joint is associated with the mesh only if it is determined that the support joint influences the rigid transformations of the mesh. Selection of a support joint may be automatic (computer implemented), manual (by a user), or some combination thereof.

Skinning process 400 presents several benefits. It supports joint stretching and squashing in extreme directions while accepting all bind pose configurations. This process also may reduce the number of joints in troublesome animation areas such as character limbs. Extra joints used by conventional animation techniques to resolve deficiencies may not be needed. Moreover, this process presents simplified cleanup methods for addressing the same deficiencies used by conventional animation methods, with a greater focus on creating aesthetic improvements as opposed to fixing flaws.

FIG. 5 illustrates two example embodiments of a two-phase skinning process 400 where an object 500 with joint 502 and mesh 504 undergoes a transformation. In the first embodiment, joint 502 is a scale non-compensating joint that is influenced by the scaling of its parent. Transformation 508-1 includes a non-rigid transformation of joint 502 and produces a final object 510 with mesh 504-1 and joint 502-1. In the second embodiment, on the other hand, joint 502 is a scale-compensating joint that is not influenced by the scaling of its parent. Transformation 508-2 does not include a rigid transformation of joint 502 and produces a final object 520 with mesh 504-2 and joint 502-2.

FIG. 6A illustrates an example embodiment of a two-phase skinning process 400 where an object (cylinder) 600 with a long chain of joints from top to bottom, undergoes a scaling and rotation transformation. In this embodiment, transformation 608 rotates and uniformly scales up object 600. Because the scaling is uniform, object 600 is expected to maintain its shape when transformation 608 is applied. In this example embodiment, one, some, or all of the joints between top joint 601 and bottom joint 602 may comprise support joints. The joints are associated with the mesh when rotation and scaling up transformation 608 is performed. The transformed object 630 scales up while approximately maintaining a consistent shape (i.e. it does not stretch or squash).

FIG. 6B illustrates two other example embodiments of two-phase skinning process 400 where an object (cylinder) 600 with a long chain of joints from top to bottom, undergoes a scaling and rotation transformation. In these embodiments, the transformations rotate and uniformly scale down object 600. Because the scaling is uniform, object 600 is expected to maintain its shape when the transformations are applied. In these example embodiments, one, some, or all of the joints between top joint 601 and bottom joint 602 may comprise support joints. In the first embodiment (transformation 607), support joints are associated with the mesh when scaling and rotation transformation 607 is performed. The transformed object 610 scales down while maintaining an approximately consistent shape. By contrast, in the second embodiment (transformation 607'), support joints are not associated with the mesh when scaling and rotation transformation 607' is performed. The transformed object 620 does not maintain a consistent shape, thereby making it appear as if a non-uniform scaling transformation was applied.

Figure 7:
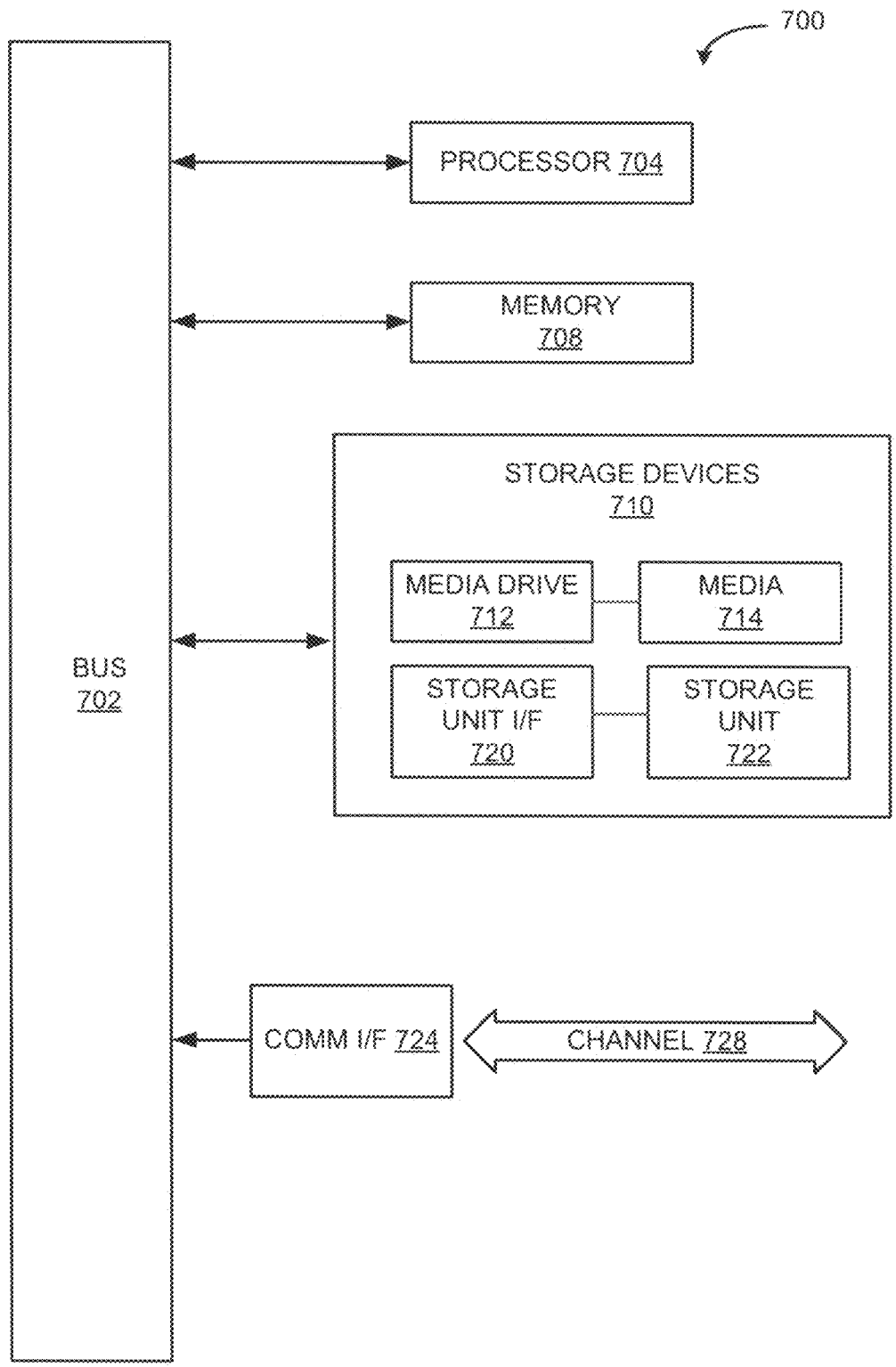
FIG. 7 is an example computing module that may be used to implement various features of the methods disclosed herein.

FIG. 7 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the application using other computing modules or architectures.

Referring now to FIG. 7, computing module 700 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 1004. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical disk drive, a CD or DVD drive (R or RW), or other removable or fixed media drive might be provided. Accordingly, storage media 714 might include, for example, a hard disk, an integrated circuit assembly, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 1020. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of skinning an object comprising a mesh and a plurality of joints, comprising:
   separating joint transformations into rigid and non-rigid parts;
   applying non-rigid joint transformations to the mesh; and
   applying rigid joint transformations to the mesh;
   wherein separating joint transformations into rigid and non-rigid parts comprises:
      determining whether a joint is scale compensating or scale non-compensating;
      determining a first matrix for a first joint based on the initial configuration of the plurality of joints; and
      determining a second matrix for the first joint based on the configuration of the plurality of joints after non-rigid transformations are applied to the plurality of joints;
   wherein determining a second matrix for the first joint comprises determining if the first joint's parent is scale compensating or scale non-compensating,
   wherein if the first joint's parent is scale compensating, determining its second matrix comprises scaling the translational part of the first joint's first matrix by the shear and scale of the first joint's parent, and
   wherein if the first joint's parent is scale non-compensating, determining its second matrix comprises scaling the translational and rotational part of the first joint's first matrix by the shear and scale of the first joint's parent.

2. The method of claim 1, wherein a non-rigid joint transformation comprises at least one of scaling or shearing a joint, and wherein a rigid joint transformation comprises at least one of rotating or translating of a joint.

3. The method of claim 2, wherein the non-rigid joint transformations are applied using linear skinning, and wherein the rigid joint transformations are applied used Dual Quaternion Skinning (DQS).

4. The method of claim 3, wherein the non-rigid joint transformations are applied using Linear Blend Skinning.

5. The method of claim 1, wherein the object comprises a support joint that is associated with the mesh when non-rigid joint transformations are applied to the mesh.

6. The method of claim 1, wherein the object comprises a support joint that is associated with the mesh when rigid joint transformations are applied to the mesh.

7. A computer-implemented method of skinning an object comprising a mesh and a plurality of joints, comprising:
   separating joint transformations into rigid and non-rigid parts;
   applying non-rigid joint transformations to the mesh; and
   applying rigid joint transformations to the mesh;

wherein separating joint transformations into rigid and non-rigid parts comprises determining whether a joint is scale compensating or scale non-compensating, and wherein the object comprises a support joint that is associated with the mesh when rigid or non-rigid joint transformations are applied to the mesh, wherein the support joint passes scale information to descendant joints.

8. A non-transitory computer readable medium having computer executable program code embodied thereon, the computer executable program code configured to cause a computing device to animate an object comprising a mesh and a plurality of joints by:

separating joint transformations into rigid and non-rigid parts;

applying non-rigid joint transformations to the mesh;

applying rigid joint transformations to the mesh;

wherein separating joint transformations into rigid and non-rigid parts comprises:

determining whether a joint is scale compensating or scale non-compensating;

determining a first matrix for a first joint based on the initial configuration of the plurality of joints; and determining a second matrix for the first joint based on the configuration of the plurality of joints after non-rigid transformations are applied to the plurality of joints;

wherein determining a second matrix for the first joint comprises determining if the first joint's parent is scale compensating or scale non-compensating, wherein if the first joint's parent is scale compensating, determining its second matrix comprises scaling the translational part of the first joint's first matrix by the shear and scale of the first joint's parent, and wherein if the first joint's parent is scale non-compensating, determining its second matrix comprises scaling the translational and rotational part of the first joint's first matrix by the shear and scale of the first joint's parent.

9. The computer readable medium of claim 8, wherein a non-rigid joint transformation comprises at least one of scaling or shearing a joint, and wherein a rigid joint transformation comprises at least one of rotating or translating of a joint.

10. The computer readable medium of claim 9, wherein the non-rigid joint transformations are applied using linear skinning, and wherein the rigid joint transformations are applied used Dual Quaternion Skinning (DQS).

11. The computer readable medium of claim 10, wherein the non-rigid joint transformations are applied using Linear Blend Skinning.

12. The computer readable medium of claim 10, wherein the object comprises a support joint.

13. The computer readable medium of claim 8, wherein the object comprises a support joint that is associated with the mesh when non-rigid joint transformations are applied to the mesh.

14. The computer readable medium of claim 8, wherein the object comprises a support joint that is associated with the mesh when rigid joint transformations are applied to the mesh.

15. A computer-implemented method of skinning an object comprising a mesh and a plurality of joints, comprising:

separating joint transformations into rigid and non-rigid parts;

applying non-rigid joint transformations to the mesh; and applying rigid joint transformations to the mesh;

wherein separating joint transformations into rigid and non-rigid parts comprises determining whether a joint is scale compensating or scale non-compensating, and wherein the object comprises a support joint that is automatically selected for association with the mesh when non-rigid joint transformations are applied to the mesh.

16. A computer-implemented method of skinning an object comprising a mesh and a plurality of joints, comprising:

separating joint transformations into rigid and non-rigid parts;

applying non-rigid joint transformations to the mesh; and applying rigid joint transformations to the mesh;

wherein separating joint transformations into rigid and non-rigid parts comprises determining whether a joint is scale compensating or scale non-compensating, and wherein the object comprises a support joint that is automatically selected for association with the mesh when rigid joint transformations are applied to the mesh.

* * * * *